(12) United States Patent
Leo et al.

(10) Patent No.: US 9,710,413 B2
(45) Date of Patent: Jul. 18, 2017

(54) INTEGRATED DATA CONCENTRATOR FOR MULTI-SENSOR MEMS SYSTEMS

(71) Applicant: STMicroelectronics S.r.l., Agrate Brianza (IT)

(72) Inventors: Marco Leo, Locate di Triulzi (IT); Alessandra Maria Rizzo Piazza Roncoroni, Abbiategrasso (IT); Marco Castellano, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 466 days.

(21) Appl. No.: 14/313,769

(22) Filed: Jun. 24, 2014

(65) Prior Publication Data
US 2015/0006778 A1    Jan. 1, 2015

(30) Foreign Application Priority Data

Jun. 28, 2013    (IT) .............................. TO2013A0537

(51) Int. Cl.
| | | |
|---|---|---|
| *G06F 13/24* | (2006.01) | |
| *G06F 13/00* | (2006.01) | |
| *G06F 13/14* | (2006.01) | |
| *G06F 13/40* | (2006.01) | |
| *G06F 13/38* | (2006.01) | |

(52) U.S. Cl.
CPC ........ *G06F 13/4027* (2013.01); *G06F 13/385* (2013.01); *G06F 13/4022* (2013.01); *G06F 2213/0016* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 2011/0072185 A1 | 3/2011 | Pinto et al. | |
| 2011/0215952 A1* | 9/2011 | Aria ....................... | G06F 3/017 341/20 |
| 2012/0254878 A1 | 10/2012 | Nachman et al. | |
| 2014/0269775 A1* | 9/2014 | Hess ........................ | H04J 3/02 370/498 |
| 2015/0006778 A1* | 1/2015 | Leo ..................... | G06F 13/4027 710/306 |

OTHER PUBLICATIONS

InvenSense Inc., "MPU-6000 and MPU-6050 Product Specification, Revision 3.3," May 16, 2012, 54 pages.

* cited by examiner

*Primary Examiner* — David E Martinez
(74) *Attorney, Agent, or Firm* — Seed IP Law Group LLP

(57) ABSTRACT

An integrated data concentrator, so-called "sensor hub", for a multi-sensor MEMS system, implements: a first interface module, for interfacing, in a normal operating mode, with a microprocessor through a first communication bus; and a second interface module, for interfacing, in the normal operating mode, with a plurality of sensors through a second communication bus; the sensor hub further implements a pass-through operating mode, distinct from the normal operating mode, in which it sets the microprocessor in direct communication with the sensors, through the first communication bus and the second communication bus. In particular, the sensor hub implements the direct pass-through operating mode in a totally digital manner.

21 Claims, 9 Drawing Sheets

| CURRENT STATE OF FSM | FIRST BUS | SECOND BUS |
|---|---|---|
| IDLE | INPUT | OUTPUT |
| DETECT | INPUT | OUTPUT |
| DET_ACK | OUTPUT | INPUT |
| NOT_ACK | OUTPUT | INPUT |
| LOAD_ADD | INPUT | OUTPUT |
| ADD_ACK | OUTPUT | INPUT |
| WRITE | INPUT | OUTPUT |
| WRITE_ACK | OUTPUT | INPUT |
| READ | OUTPUT | INPUT |
| READ_ACK | INPUT | OUTPUT |

FIG. 9

INTEGRATED DATA CONCENTRATOR FOR MULTI-SENSOR MEMS SYSTEMS

BACKGROUND

Technical Field

The present disclosure relates to an integrated data concentrator for multi-sensor MEMS systems, in particular provided with the so-called "pass-through" operating mode.

Description of the Related Art

The increasing use of sensors including micromechanical structures made, at least in part, of semiconductor materials and with MEMS (Micro-Electro-Mechanical Systems) technology is known in portable electronic apparatuses, such as, for example, laptops, tablets, smartphones, digital audio players, photographic cameras or video cameras, and consoles for videogames.

These sensors have advantageous characteristics, amongst which extremely compact dimensions, reduced consumption levels, and good electrical performance, and may be used for example for inertial-navigation applications, for providing user interfaces, for detecting displacements in three-dimensional space, or for detecting environmental parameters (such as pressure, humidity, temperature).

In particular, so-called "multi-sensor systems" have recently been proposed, which envisage joint and combined use of a wide range of sensors, for example accelerometers, gyroscopes, pressure sensors, humidity sensors, temperature sensors, magnetometers. These sensors may be provided within one and the same package, in an integrated manner; alternatively, the various sensors may be physically distinct, but in any case functionally connected, for example via a communication bus.

The above multi-sensor systems enable grouping, within a single integrated system, of a plurality of detection possibilities, which may advantageously concur in providing one or more common functions, for example for providing an accurate motion-detection system.

In order to facilitate management by an external microprocessor (typically the microprocessor of the host portable electronic apparatus), the multi-sensor system comprises an integrated data concentrator (the so-called "sensor hub", this term being used hereinafter), having, amongst other functions, the function of interfacing between the integrated sensors and the external microprocessor.

For instance, the sensor hub, typically including a microcontroller (or a similar processing unit, for example a "picocontroller", or implemented by means of FPGA—Field-Programmable Logic Array), acquires detection signals read by the various sensors, which are typically connected to a single digital communication bus, and supplies these signals to the external microprocessor, possibly after suitable processing operations.

Generally, the presence of a sensor hub relieves the external microprocessor from the task of monitoring the outputs of the plurality of sensors, providing a single acquisition interface, and moreover from the computational burden linked to at least part of the signal-processing operations.

FIG. 1 is a schematic representation of a sensor hub 1, which implements: a first interface module 2a, for connection to an external microprocessor 3, through a first digital communication bus 4, of a bidirectional type; and a second interface module 2b, for connection to a plurality of sensors 6, through a second digital communication bus 8, of a bidirectional type.

Typically, in a "standard" or "normal" operating mode, the first interface module 2a operates in "slave" mode with respect to the external microprocessor 3 in the communication through the first digital communication bus 4 (main bus), which may for example be regulated by a serial protocol, such as the I$^2$C protocol (Inter Integrated Circuit) or SPI (Serial Parallel Interface), and the second interface module 2b operates in "master" mode with respect to the sensors 6 in the communication through the second digital communication bus 8 (auxiliary bus), which may, for example, be regulated by the same serial protocol or else by a different one.

A specific operating mode that is generally used by a sensor hub is the one referred to as "pass-through" mode, which envisages providing a direct communication path between the external microprocessor and the various sensors coupled to the communication bus, in particular operating conditions, in effect rendering the sensor hub itself "transparent" for the external microprocessor.

Generally, it is moreover desired to allow a complete freedom of choice by the system on the use, or otherwise so, of the sensor hub during acquisition of the signals.

For instance, the pass-through operating mode may prove advantageous in a step of configuration of the sensors in order to allow the external microprocessor to set directly configuration parameters for the same sensors, thus preventing a double operation of configuration, first of the sensor hub by the external microprocessor, and then of the sensors by the sensor hub.

As a further example, the pass-through operating mode may prove advantageous in the case where some sensors coupled to the communication bus are inactive, the interface operation provided by the sensor hub being in fact convenient when a sufficiently high number of sensors is present.

A solution of a known type for providing the aforesaid pass-through mode envisages, as shown schematically in FIG. 2, the use of appropriate analog switch elements, designated by 9, which are suitably controlled by an electrical control signal $S_a$ received at input from the sensor hub 1 in order to create a direct electrical-connection path between the sensors 6 and the external microprocessor 3. The analog switches 9 hence provide a sort of short circuit between the first and second digital communication buses 4, 8.

The analog switches 9 are electrically connected between input and output pads (not shown in the figure) of the sensor hub 1, as additional analog discrete components.

Consequently, such an implementation of the pass-through mode uses a modification at the physical, circuit level of the sensor hub, and uses a knowledge of the construction of the electrical-interconnection paths and of the configuration of the pads of the sensor hub. Furthermore, the presence of the analog switches entails an evident increase in terms of area occupation.

BRIEF SUMMARY

The present disclosure is directed to a device that includes a microprocessor, a first communication bus, and a package. The package including a plurality of sensors, a second communication bus, an integrated data concentrator configured to operate in a first operating mode and a second operating mode. The data concentrator includes active circuitry, a first interface module, a second interface module, in the first operating mode the data concentrator couples the microprocessor to the first interface module with the first communication bus and the second operating interface module to the plurality of sensors with the second communication bus, and in the second operating mode the data concentrator couples the microprocessor to the sensors with the first communication bus and the second communication bus.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein:

FIG. 9 shows a Table regarding operating states of components of the sensor hub of FIG. 6.

DETAILED DESCRIPTION

Figure 1:
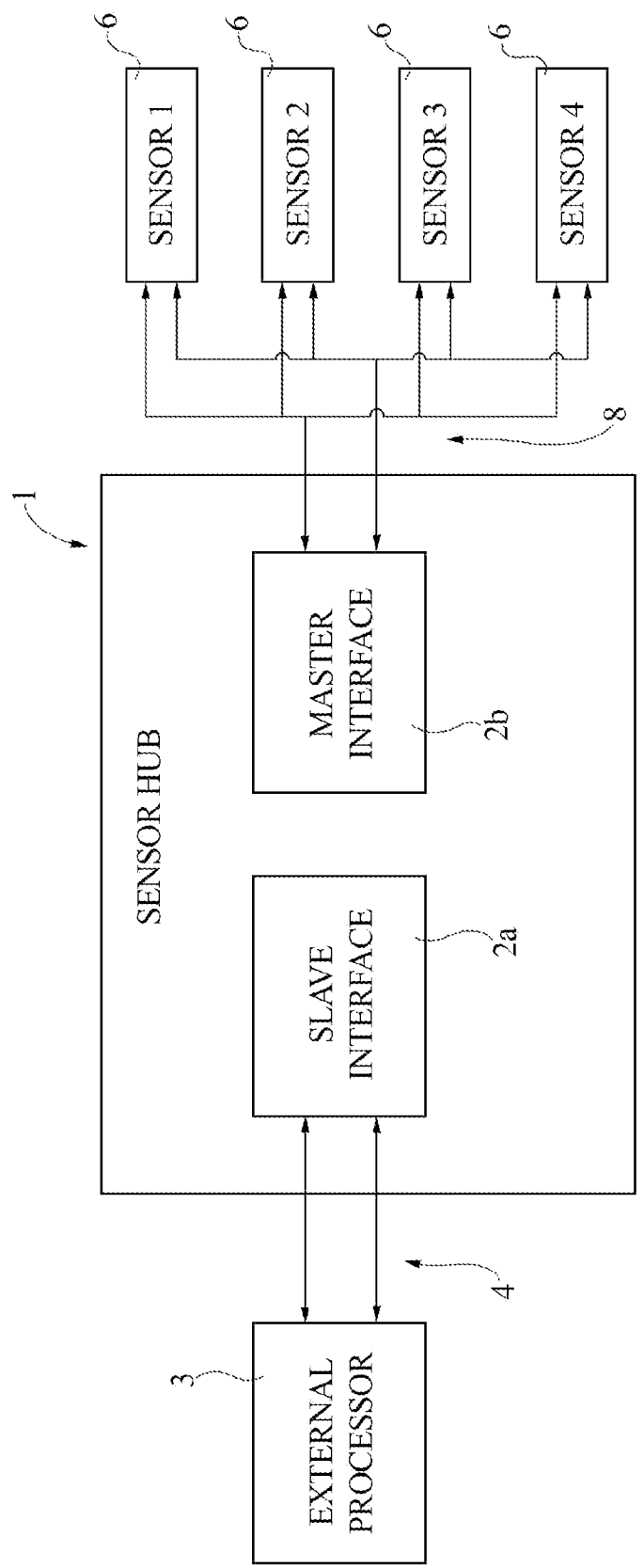
FIG. 1 is a schematic representation of a sensor hub of a known type.
Figure 2:
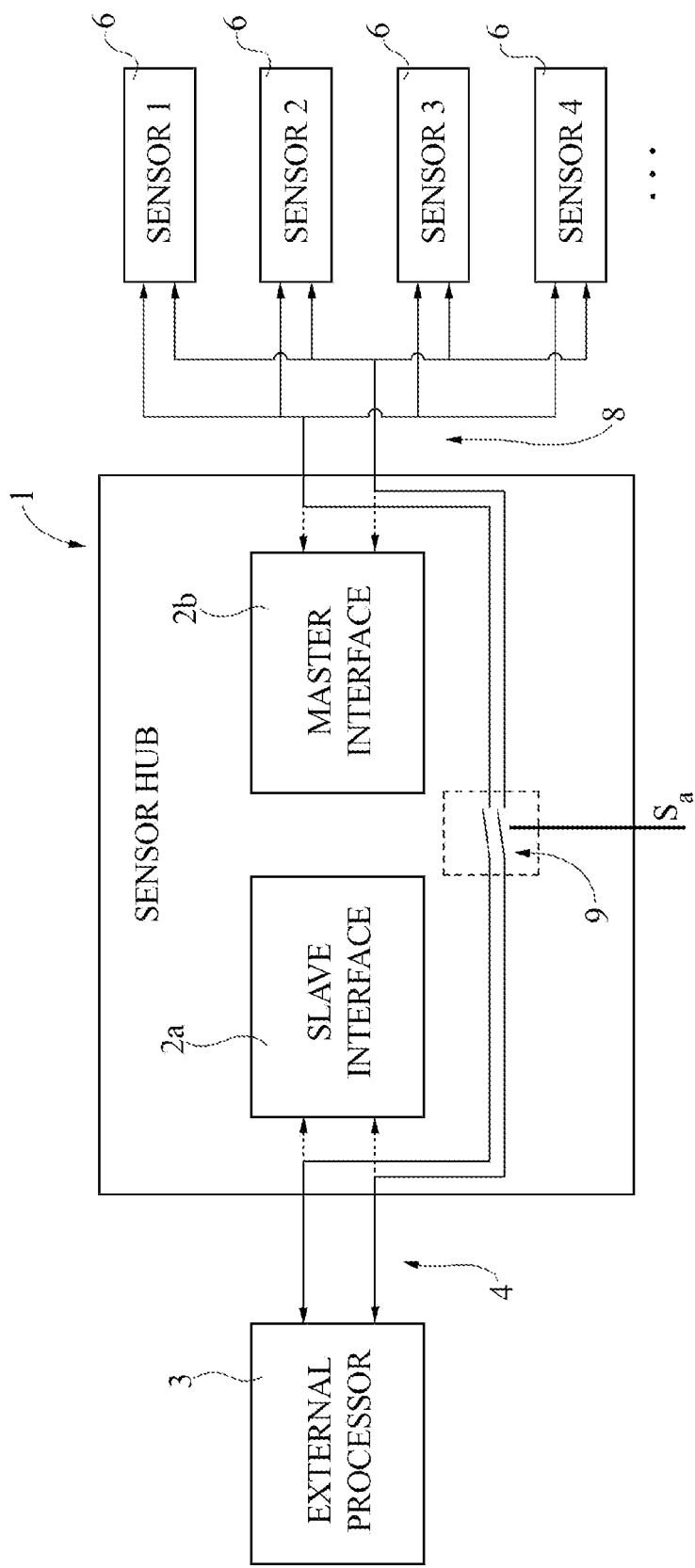
FIG. 2 is a schematic representation of a sensor hub of a known type in a pass-through operating mode.
Figure 3:
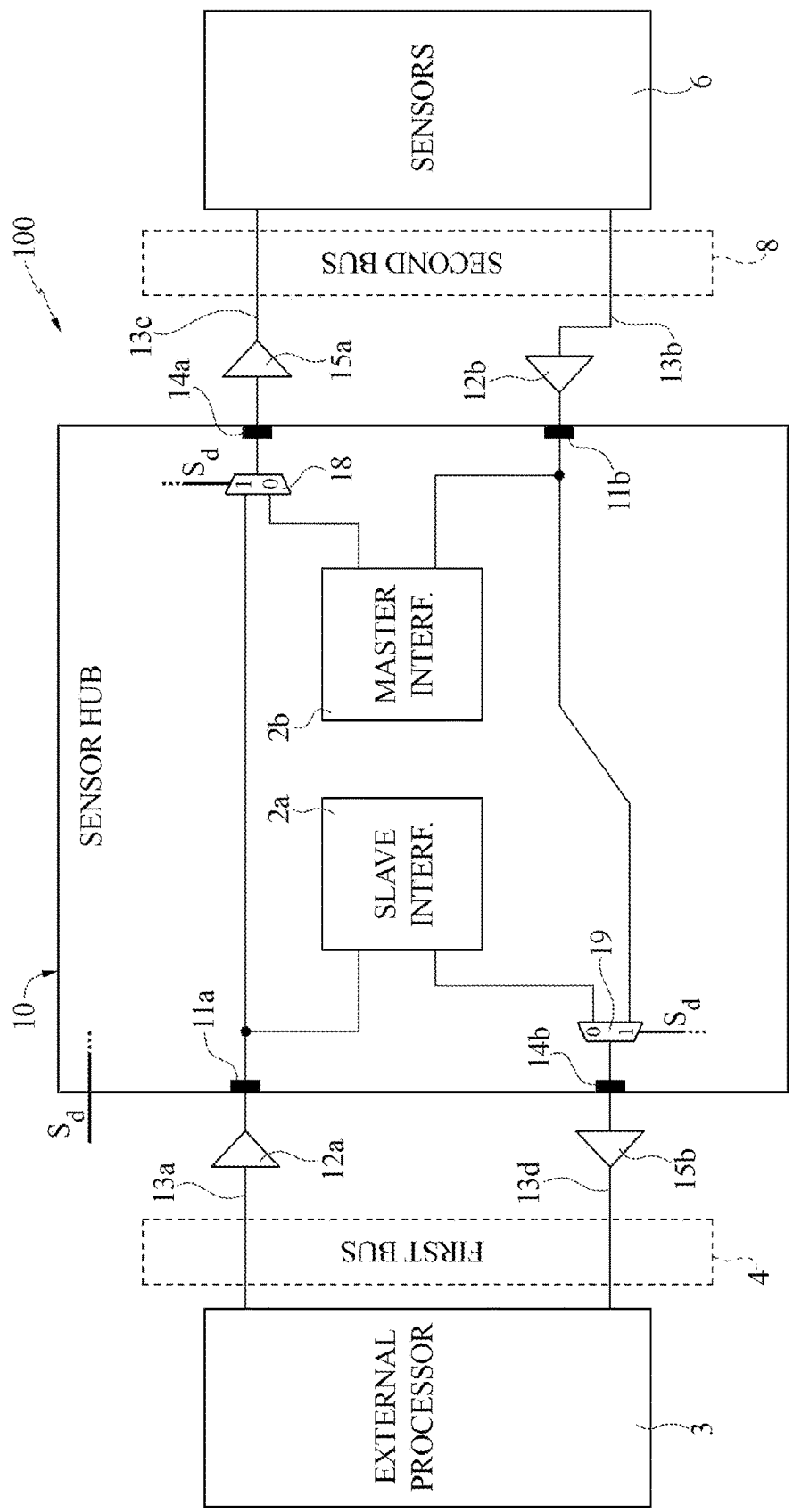
FIG. 3 is a schematic representation of a sensor hub, according to a first embodiment of the present solution.

With reference to FIG. 3, a description is now made of a first embodiment of an integrated data concentrator (once again referred to as "sensor hub"), designated as a whole by 10, for a multi-sensor MEMS system 100.

As will be described in detail hereinafter, one aspect of the present solution envisages that the pass-through operating mode is implemented in the sensor hub 10 in a totally digital manner.

In detail, the sensor hub 10, which includes, as indicated previously, a microcontroller ("picocontroller" or similar processing unit), implements: the first interface module 2a, for bidirectional connection at input and output with respect to the external microprocessor 3, through the first digital communication bus 4; and the second interface module 2b, for bidirectional connection at input and output with respect to the plurality of sensors 6 (here illustrated schematically with a single block), through the second digital communication bus 8.

As it will be evident (here not illustrated in detail), the first and second interface modules 2a, 2b are moreover operatively coupled for mutual exchange of data (information and signals).

In general, in a normal operating mode, in a first direction of communication, the second interface module 2b acquires first signals from the sensors 6, and the first interface module 2a supplies to the external microprocessor 3 second signals, which are a function of the first signals; in a second direction of communication, the first interface module 2a acquires respective first signals from the external microprocessor 3, and the second interface module 2b supplies to the sensors 6 respective second signals, which are a function of the respective first signals.

The sensor hub 10 has: a first input pad 11a, connected to the first digital communication bus 4 through a first input buffer 12a, for receiving signals from the external microprocessor 3 on a first communication line 13a, of a unidirectional type at input; and a second input pad 11b, connected to the second digital communication bus 8 through a second input buffer 12b, for receiving signals from the sensors 6 on a second communication line 13b, of a unidirectional type at input.

The first input pad 11a is moreover connected to an input of the first interface module 2a, and the second input pad 11b is connected to an input of the second interface module 2b.

The sensor hub 10 has: a first output pad 14a, connected to the second digital communication bus 8 through a first output buffer 15a, for sending signals to the sensors 6 on a third communication line 13c, of a unidirectional type at output; and a second output pad 14b, connected to the first digital communication bus 4 through a second output buffer 15b, for sending signals to the external microprocessor 3 on a fourth communication line 13d, of a unidirectional type at output.

According to one aspect of the present solution, the sensor hub 10 implements a first multiplexer 18, with two inputs and one output, namely, a first input connected to the first input pad 11a, a second input connected to an output of the second interface module 2b, and an output connected to the first output pad 14a.

The sensor hub 10 further implements a second multiplexer 19, which also has two inputs and one output, namely, a first input connected to the second input pad 11b, a second input connected to an output of the first interface module 2a, and an output connected to the second output pad 14b.

The first and second multiplexers 18, 19 have a respective control input, which receive a common control signal $S_d$, of a digital type, based on the value of which the respective output is selectively connected to the respective first input or, alternatively, to the respective second input.

The control signal $S_d$ is received at input to the sensor hub 10, from outside the same sensor hub 10. For instance, control signal $S_d$ can be supplied by the external microprocessor 3, or else by other components of the electronic apparatus (not illustrated), in which the sensor hub is used; advantageously, the control signal $S_d$ may be provided by writing in a dedicated register of the microcontroller (or similar processing unit) of the sensor hub 10 in such a way as not to use the presence of a dedicated input pad.

Operation of the sensor hub 10 envisages: a "normal" operating mode, where the sensor hub 10 provides an interface between the sensors 6 and the external microprocessor 3 through the first and second interface modules 2a, 2b; and a "pass-through" operating mode, where the sensor hub 10 is in effect "transparent" for the external microprocessor 3, providing a direct connection between the sensors 6 and the external microprocessor 3.

The operating mode, whether normal operating mode or, alternatively, pass-through operating mode, is selected on the basis of the value of the control signal $S_d$, which is supplied to the first and second multiplexers 18, 19.

In detail, in the normal operating mode, the control signal $S_d$ has a value such that the output of the first multiplexer 18 is connected to the second interface module 2b, and the output of the second multiplexer 19 is connected to the first interface module 2a.

Figure 4:
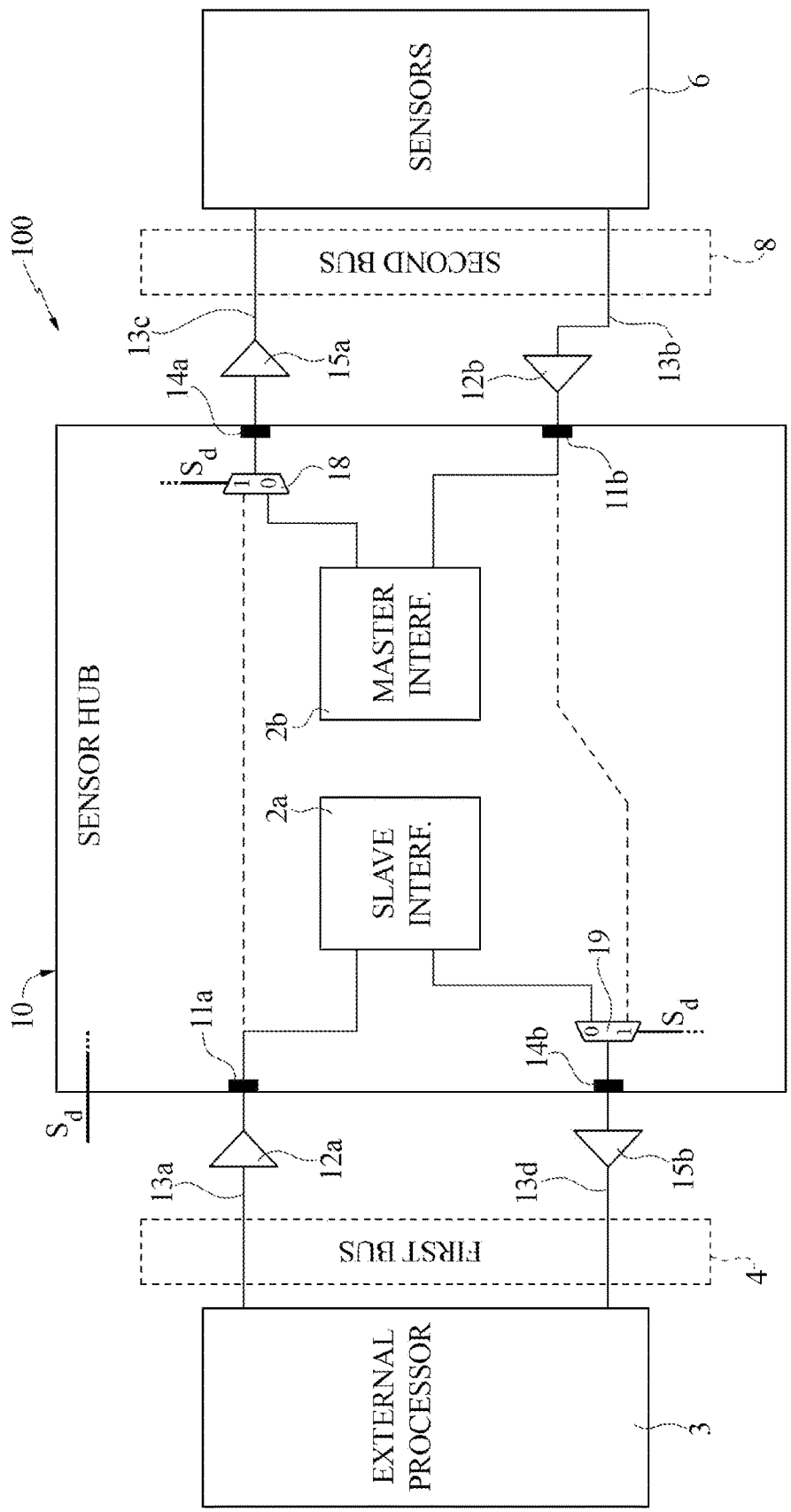
FIGS. 4 and 5 are schematic representations of the sensor hub of FIG. 3, in different operating modes, respectively in a normal operating mode and in a pass-through operating mode.

The resulting electrical connections, in the normal operating mode, are hence schematically represented in FIG. 4.

In the pass-through operating mode, the control signal $S_d$ has, instead, a value such that the output of the first multiplexer 18 is connected to the first input pad 11a and the output of the second multiplexer 19 is connected to the second input pad 11b.

Figure 5:
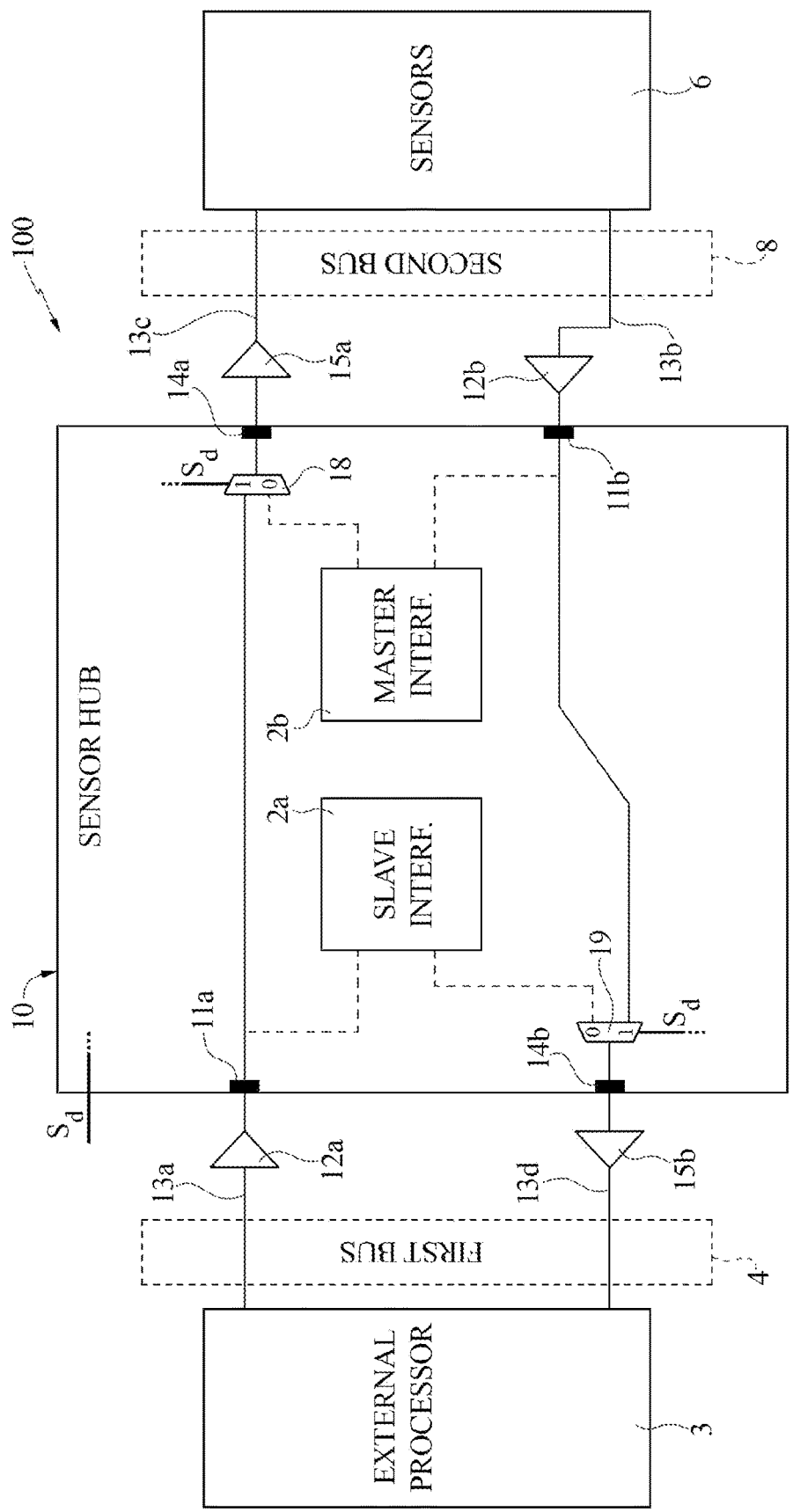

The resulting electrical connections, in pass-through operating mode, are hence schematically represented in FIG. 5.

A second embodiment of the sensor hub 10 is now described, which envisages that at least one of the communication lines coupling the sensor hub 10 to the external microprocessor 3 and/or to the sensors 6 is of a bidirectional type.

Figure 6:
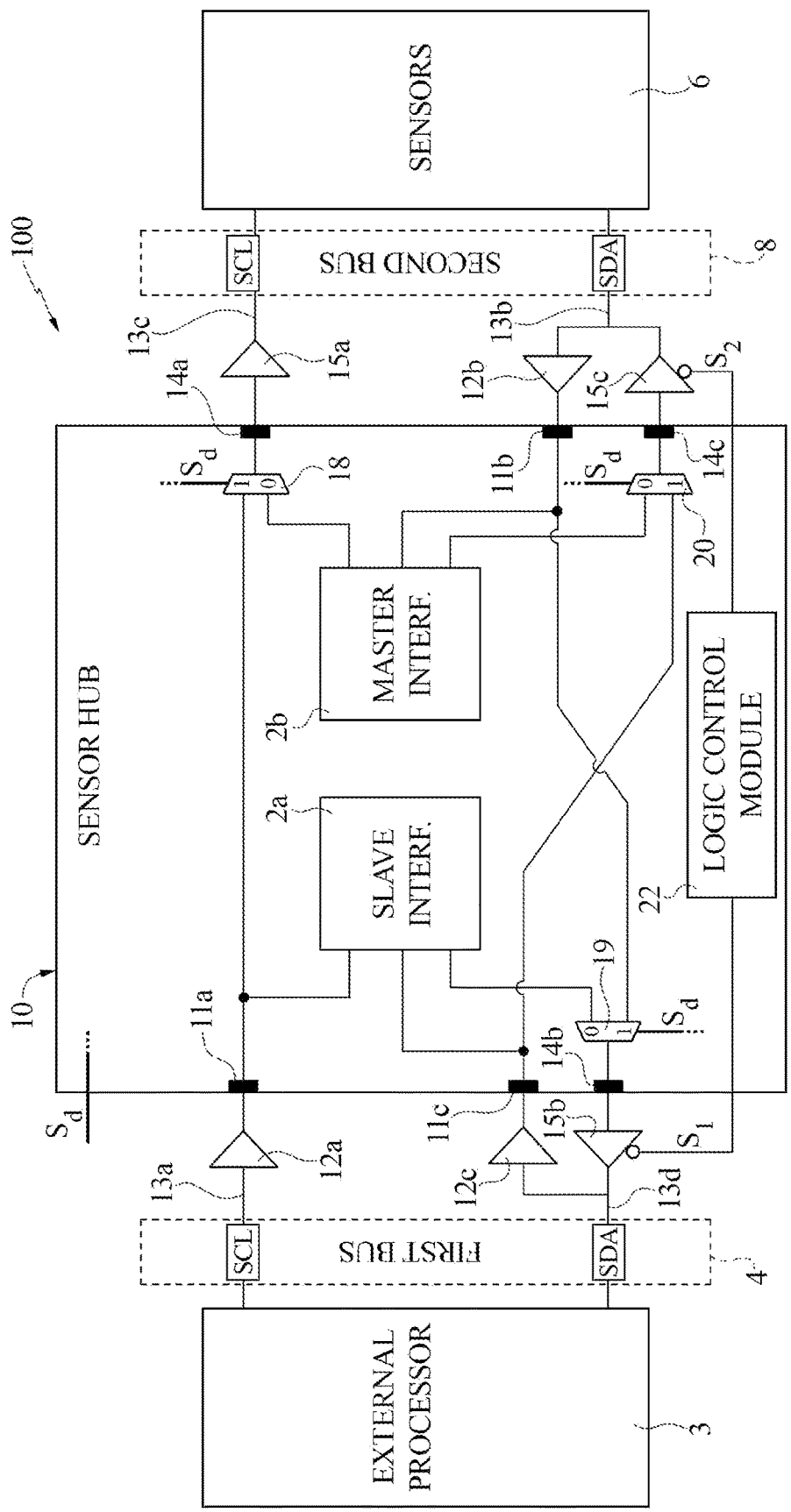
FIG. 6 is a schematic representation of a sensor hub, according to a second embodiment of the present solution.

In particular, in the embodiment illustrated in FIG. 6, both the second communication line 13b and the fourth communication line 13d are of a bidirectional type, hence envisaging exchange of signals between the sensor hub 10 and, respectively, the first and second digital communication buses 4, 8 in both directions, according to a purposely provided reception and transmission protocol.

For instance, this embodiment finds application in the case where digital communication between the sensor hub 10 and the external microprocessor 3, and between the same sensor hub 10 and the sensors 6 is implemented using the I²C protocol.

In this case, in fact, the first and third communication lines 13a, 13c, of a unidirectional type, refer to the clock line SCL (Serial Clock Line), whereas the second and fourth communication lines 13b, 13d, of a bidirectional type, refer to the data line SDA (Serial DAta line), of the I²C protocol.

Sensor hub 10 in this case comprises: a third input pad 11c, connected to the first digital communication bus 4 through a third input buffer 12c, for receiving signals from the external microprocessor 3 on the fourth communication line 13d; and a third output pad 14c, connected to the second digital communication bus 8 through a third output buffer 15c, for sending signals to the sensors 6 on the second communication line 13b. The third input pad 11c is moreover connected to an input of the first interface module 2a.

The sensor hub 10 in this case implements a third multiplexer 20, once again with two inputs and one output, namely, a first input connected to the third input pad 11c, a second input connected to an output of the second interface module 2b, and an output connected to the third output pad 14c.

Also the third multiplexer 20, like the first and second multiplexers 18, 19, has a respective control input, which receives the common control signal $S_d$, of a digital type, based on the value of which the respective output is selectively connected to the respective first input or, alternatively, to the respective second input.

Furthermore, in this embodiment, both the second output buffer 15b and the third output buffer 15c are of a controlled type; i.e., they either enable or do not enable (selectively) the passage of signals from their respective input to their respective output, as a function of a respective enable signal $S_1$, $S_2$ received on a respective control input.

In this regard, the sensor hub 10 implements a direction-control logic module 22, operatively coupled to the second output buffer 15b and to the third output buffer 15c in order to supply the enable signals $S_1$, $S_2$, having an appropriate value.

The aforesaid direction-control logic module 22 enables management of the direction of communication, generating, by means of a dedicated combinational logic, the aforesaid enable signals $S_1$, $S_2$.

According to one aspect of the present solution, the direction-control logic module 22 is able to monitor, directly or indirectly, the communication events on the fourth communication line 13d, and as a function of this monitoring, is able to generate the appropriate enable signals $S_1$, $S_2$ in such a way as to associate the direction of communication to the detected communication requirements.

Figure 7:
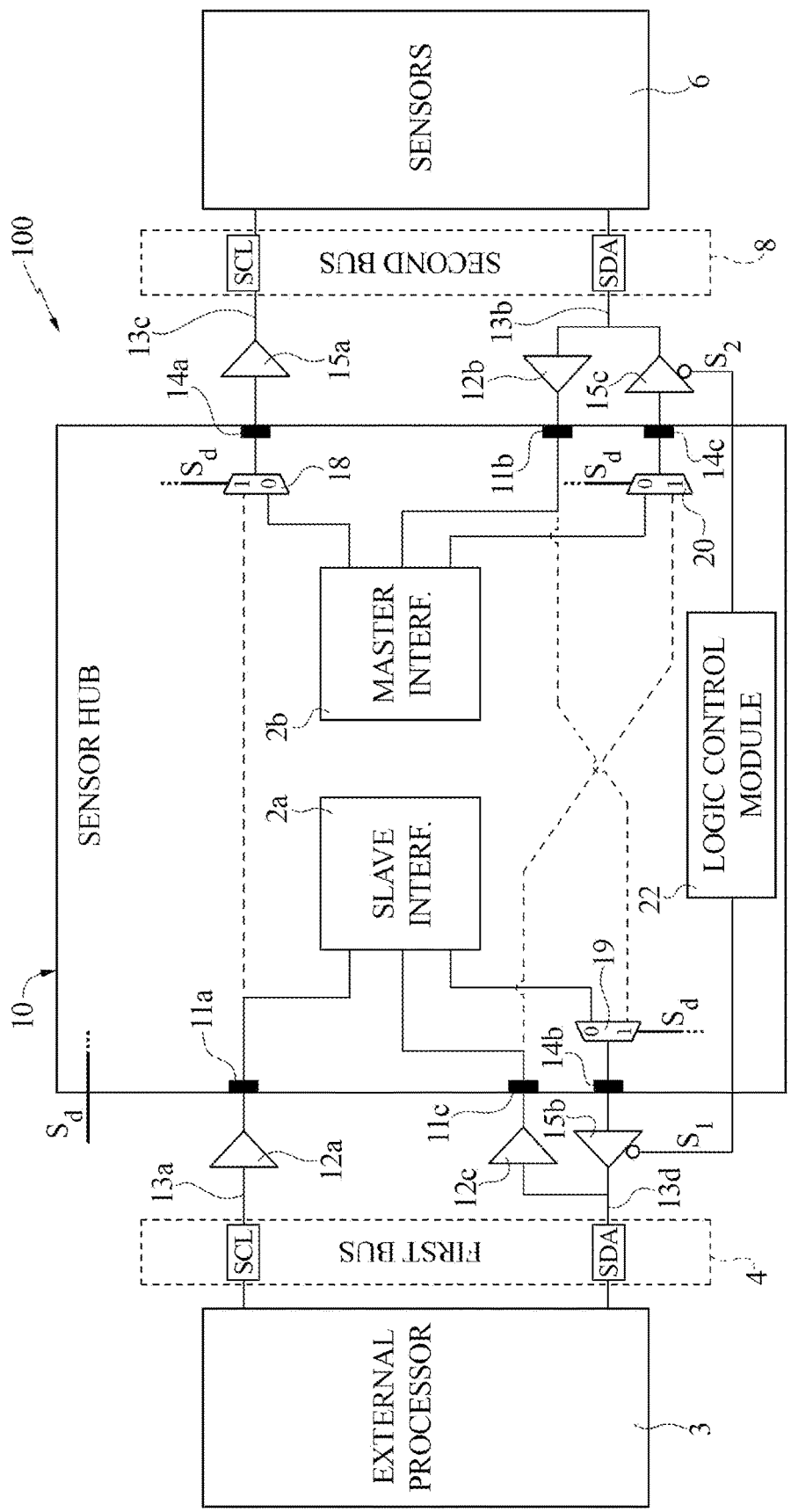
FIGS. 7 and 8 are schematic representations of the sensor hub of FIG. 6, in different operating modes, respectively in a normal operating mode and in a direct pass-through operating mode.
Figure 8:
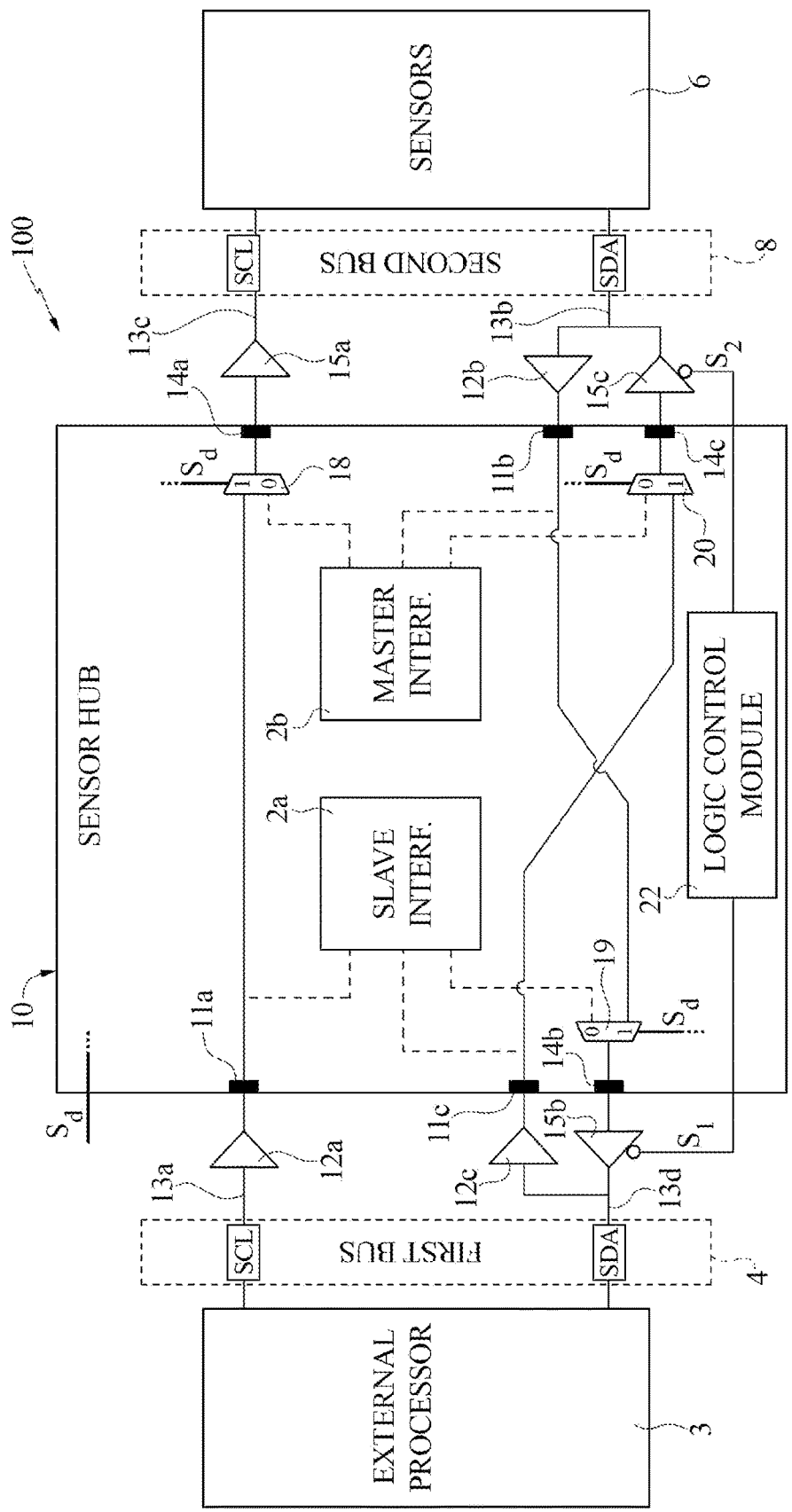

In particular, this operation of the direction-control logic module 22 applies both in normal operating mode (shown by way of example in FIG. 7) and in pass-through operating mode (shown by way of example in FIG. 8) of the sensor hub 10.

In the normal operating mode, the control signal $S_d$ once again has a value such that the output of the first multiplexer 18 is connected to the second interface module 2b, and the output of the second multiplexer 19 is connected to the first interface module 2a. Moreover, the output of the third multiplexer 20 is connected to the respective output of the second interface module 2b.

In pass-through operating mode, the control signal $S_d$ once again has a value such that the output of the first multiplexer 18 is connected to the first input pad 11a, and the output of the second multiplexer 19 is connected to the second input pad 11b. Moreover, the output of the third multiplexer 20 is connected to the third input pad 11c.

The direction of communication on the second and fourth communication lines 13b, 13d is determined in both of the operating modes by the direction-control logic module 22, appropriately enabling or disabling the second output buffer 15b or, alternatively, the third output buffer 15c.

According to a further aspect of the present solution, the first interface module 2a (operating as a slave in relation to the external microprocessor 3) implements a finite-state machine FSM, which is active for monitoring continuously the signals present on the fourth communication line 13d.

The direction-control logic module 22 is in this case operatively coupled to the first interface module 2a in such a way as to control the direction of communication as a function of the evolution of the finite-state machine FSM.

In greater detail, the Table in FIG. 9 summarizes the states (at INPUT, or at OUTPUT) of the first and second digital communication buses 4, 8, as determined by the enable signals $S_1$, $S_2$, as the state of the finite-state machine FSM monitoring the communication events (the evolution of which is based, in a known way, on the clock signal) varies. The example illustrated refers to the case in which the communication events are determined by the use of the I²C communication protocol (of a known type, here not described in detail).

For instance, in the case where the direction-control logic module 22 detects the state 'LOAD_ADD' of the finite-state machine FSM, regarding loading of an address from the external microprocessor 3 by the first interface module 2a, the direction-control logic module 22 is configured for:

setting at input the fourth communication line 13d, disabling the second output buffer 15b, thus enabling reception of the address signal through the third input buffer 12c; and setting at output the second communication line 13b, enabling the third output buffer 15c, thus enabling the corresponding addressing of a specific sensor 6.

Once again by way of example, in this operating situation, the first enable signal $S_1$ may have the logic value '1', and the second enable signal $S_2$ may have the logic value '0'.

Then, at the next evolution of the finite-state machine FSM (as a function of the clock signal and of the requirements of the communication protocol), the direction-control logic module 22 detects the new state assumed by the finite-state machine FSM, for setting the direction of communication accordingly.

Once again in the above example, the I²C communication protocol envisages, following upon loading of an address, sending of an acknowledgement of address receipt so that the new state of the finite-state machine FSM is 'ADD_ACK'.

The direction-control logic module 22 is consequently configured for:
   setting at output the fourth communication line 13d, enabling the second output buffer 15b, thus enabling sending of the acknowledgement signal to the external microprocessor 3; and
   setting at input the second communication line 13b, disabling the third output buffer 15c.

The advantages of the solution described are clear from the foregoing discussion.

In particular, the totally digital implementation of the pass-through operating mode in the sensor hub has a minimal impact in terms of occupation of area, using logic structures already present in currently used systems.

The solution described is further implemented at a logic level (in particular at the RTL—Register Transfer Level), by means of logical synthesis, hence being altogether independent of the type of interconnections and pads used at the level of circuit design and of the design libraries used.

No modifications to the libraries of the pre-existing digital pins are thus used, hence enabling immediate practical implementation of the solution described, also via updating, or modification, of already existing systems.

The above solution is moreover of generic application, irrespective of the communication protocol used on the digital communication bus, also in the case where, as has been pointed out, the protocol itself envisages bidirectional communication lines.

For instance, the solution described may implement an SPI (Serial Parallel Interface) communication protocol, for communication between the external microprocessor 3 and the sensor hub 10 and/or between the sensor hub 10 and the sensors 6.

Finally, it is clear that modifications and variations may be made to what has been described and illustrated herein, without thereby departing from the scope of the present disclosure.

For instance, it is evident that the structure of the sensor hub 10 may differ from what has been illustrated previously.

In particular, the foregoing description has focused on the communication and interface parts; it is, however, evident that the sensor hub 10 may include, in a way not illustrated, a module for processing the signals received by the sensors 6, for example for joint pre-processing of the signals according to fusion algorithms. The sensor hub 10 may moreover comprise one or more memory registers.

Furthermore, the sensor hub 10 may be provided in an integrated manner within one and the same package with one or more of the sensors 6; for example, the sensor hub 10 may comprise in an integrated manner an acceleration sensor, being connected, through the second digital bus 8, to further external sensors, for example to a gyroscope, a pressure sensor, and/or a magnetometer.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a microprocessor;
   a first communication bus;
   a plurality of sensors;
   a second communication bus; and
   an integrated data concentrator configured to operate in a first operating mode and a second operating mode, the data concentrator including:
      a first interface module;
      a second interface module; and
      a first selection module between the first interface module and the first communication bus and a second selection module between the second interface module and the second communication bus, in the first operating mode the data concentrator first selection module couples the microprocessor to the first interface module through the first communication bus and the second selection module couples the second interface module to the plurality of sensors through the second communication bus, and in the second operating mode the data concentrator first and second selection modules couples the microprocessor to the sensors through the first communication bus and the second communication bus and the first selection module disconnects from a terminal of the first interface module and the second interface module disconnects from a terminal of the second interface module.

2. The device according to claim 1, further comprising a package, the package including the plurality of sensors, the second communication bus, and the integrated data concentrator.

3. The device according to claim 1 wherein the first selection module includes
   a first input buffer;
   a first input pad coupled to the first communication bus through the first input buffer;
   a first output buffer;
   a first output pad coupled to the second communication bus through the output buffer; and
   a first multiplexer having:
      a first input coupled to the first input pad;
      a second input coupled to an output of the second interface module; and
      a first output coupled to the first output pad;
      a control input configured to receive a control signal that selects the first input or the second input.

4. The device according to claim 3 wherein the data concentrator is configured to implement the first operating mode or the second operating mode in response to the control signal that is received from outside the data concentrator.

5. The device according to claim 3 wherein in the second operating mode, the first multiplexer is controlled to connect the first input pad directly to the first output pad.

6. The device according to claim 3 wherein the first input pad is coupled to the first communication bus through a first bidirectional communication line and the first output pad is coupled to the second communication bus by a second bidirectional communication line.

7. The device according to claim 6, wherein the second selection module includes:
a second input buffer;
a second input pad coupled to the second communication bus through the second input buffer; and
a second output pad;
a second output buffer that couples the second output pad to the first communication bus;
a second multiplexer having:
a first input coupled to the second input pad;
a second input coupled to an output of the first interface module;
an output coupled to the second output pad; and
a control input configured to receive the control signal that selects the first input or the second input of the second multiplexor.

8. The device according to claim 7 wherein in the second operating mode: the first multiplexer couples the first input pad directly to the first output pad to provide a direct communication between the microprocessor and the sensors in a first direction;
and the second multiplexer couples the second input pad directly to the second output pad to provide a direct communication between the microprocessor and the sensors in a second direction.

9. The device according to claim 7 wherein the first and second output buffers are of a controlled type, which are configured to be enabled as a function of a respective enable signal, the device further comprising:
a direction-control logic module coupled to the first and second output buffers to supply the enable signals to define a direction of communication between the microprocessor and the sensors.

10. The device according to claim 9 wherein the direction-control logic module is configured to monitor communication events on the first communication line to detect communication requirements and to generate the control signals to associate the direction of communication to the detected communication requirements.

11. The device according to claim 10 wherein the first interface module is configured to implement a finite-state machine, configured to continuously monitor signals present on the first communication line; and the direction-control logic module is coupled to the first interface module, to control the direction of communication as a function of the finite-state machine.

12. The device according to claim 6 wherein the communication on at least one between said the first and second communication lines is implemented with I²C protocol.

13. The device according to claim 12 wherein the data concentrator further includes:
a third input pad;
a third input buffer;
a first unidirectional communication line that couples the third input pad to the first communication bus through the third input buffer; and
a third output pad;
a third output buffer;
a second unidirectional communication line that couples the third output pad to the second communication bus through the third output buffer;
a third multiplexer having:
a first input coupled to the third input pad;
a second input coupled to another output of the second interface module;
an output coupled to the third output pad; and
a control input configured to receive the control signal that selects the first input or the second input of the third multiplexer.

14. The device according to claim 13 wherein the first and second unidirectional communication lines are dedicated to transmission of a clock signal; and the first and second communication lines are dedicated to transmission of data signals.

15. A package, comprising:
a plurality of sensors;
a first communication bus coupled to the plurality of sensors;
a data concentrator coupled to the sensors by the first communication bus, the data concentrator including:
a first input and a second input;
a first output and a second output;
a first multiplexer coupled to the first input and the first output;
a second multiplexer coupled to the second input and the second output;
a first interface module coupled to the first input, the first multiplexer, and the second multiplexer; and
a second interface module coupled to the second input, the first multiplexer, and the second multiplexer.

16. The package of claim 15 wherein the data concentrator is configured to receive an external control that is configured to control the first and the second multiplexer.

17. The package of claim 15 wherein the data concentrator includes:
a third input coupled to the first interface module;
a third output;
a third multiplexer coupled to the third input, the third output, and the second interface module.

18. The package of claim 17, further comprising:
a first input buffer coupled to the first input;
a second input buffer coupled to the second input;
a third input buffer coupled to the third input;
a first output buffer coupled to the first output;
a second output buffer coupled to the second output;
a third output buffer coupled to the third output; and
a logic control module coupled between the second and third output buffers and configured to provide control signals to the second and third output buffers.

19. A method, comprising:
coupling a plurality of sensors to a data concentrator in a single package;
coupling a first multiplexer in between a first input and a first output of the data concentrator;
coupling a second multiplexer between a second input and a second output of the data concentrator;
coupling a first interface module to the first input, the first multiplexer, and the second multiplexer; and
coupling a second interface module to the second input, the first multiplexer, and the second multiplexer.

20. The method of claim 19, further comprising coupling a third multiplexer between a third input, a third output, and the second interface module.

21. The method of claim 20, further comprising:
coupling a first input buffer to the first input;
coupling a second input buffer to the second input;
coupling a third input buffer to the third input;
coupling a first output buffer to the first output;
coupling a second output buffer to the second output;
coupling a third output buffer to the third output; and
coupling a logic control module between the second and third output buffers.

* * * * *